United States Patent [19]
Sork

[11] 4,409,804
[45] Oct. 18, 1983

[54] VEHICLE ANTI-THEFT LOCKING DEVICE
[76] Inventor: Mark P. Sork, 24091 Juaneno, Mission Viejo, Calif. 92691
[21] Appl. No.: 249,815
[22] Filed: Apr. 1, 1981
[51] Int. Cl.³ .......................... B62H 5/12; B62H 5/14; E05B 65/12; E05B 71/00
[52] U.S. Cl. ........................................... 70/14; 70/19; 70/226; 70/236
[58] Field of Search ................ 70/236, 233, 226, 234, 70/58, 19, 14

[56] References Cited
U.S. PATENT DOCUMENTS

| 557,233 | 3/1896 | Patterson | 70/236 |
| 561,070 | 5/1896 | Anderson | 70/226 |
| 563,991 | 7/1896 | Thomas et al. | 70/233 X |
| 584,575 | 6/1897 | Cornell | 70/236 X |
| 746,365 | 12/1903 | McNary | 70/236 |
| 1,429,334 | 9/1922 | Furber | 70/14 X |
| 1,502,809 | 7/1924 | Connors | 70/226 |
| 3,091,011 | 5/1963 | Campbell | 70/58 X |
| 3,667,259 | 6/1972 | Reque et al. | 70/19 X |
| 3,749,295 | 7/1973 | Palmer | 70/234 X |
| 3,760,620 | 9/1973 | Robles | 70/14 X |
| 3,763,674 | 10/1973 | Zahner | 70/226 |
| 3,855,825 | 12/1974 | Pickard | 70/226 X |
| 4,019,354 | 4/1977 | O'Dell | 70/236 |
| 4,031,726 | 6/1977 | DeJager | 70/226 |
| 4,175,410 | 11/1979 | Schwaiger | 70/226 |
| 4,294,080 | 10/1981 | Metzger | 70/236 X |

FOREIGN PATENT DOCUMENTS

| 15878 | 9/1980 | European Pat. Off. | 70/233 |
| 524192 | 5/1921 | France | 70/18 |
| 441460 | 11/1948 | Italy | 70/18 |
| 175600 | 3/1935 | Switzerland | 70/14 |
| 3671 | of 1900 | United Kingdom | 70/236 |

Primary Examiner—Cornelius J. Husar
Assistant Examiner—Carl F. Pietruszka
Attorney, Agent, or Firm—Boniard I. Brown

[57] ABSTRACT

Apparatus for locking a motorcycle or the like which has a first part which rotates during powered movement of the associated motor vehicle and a second discrete part which is disposed proximate to the first part, the first part moving independently of the second part. The apparatus includes first and second elongated members, a pivot mounting the first member to the second member. Structure on the first or second member cooperates with one of the first and second parts of the associated motor vehicle, and is dimensioned and configured for interfering relationship of the padlocked apparatus with the other of the first and second parts of the associated motor vehicle.

6 Claims, 8 Drawing Figures

VEHICLE ANTI-THEFT LOCKING DEVICE

BACKGROUND OF THE INVENTION

The invention relates to a locking mechanism and particularly to a mechanism adapted for use with a motor vehicle. While having particular application to motorcycles, motor scooters and the like, it will be understood that the invention also has application to other vehicles.

The prior art includes various locking mechanisms such as shown in U.S. Pat. No. 4,031,726. The apparatus shown therein is particularly suited for use with aircraft with which it also functions as a wheel chock. Such apparatus is not wholly satisfactory for use with motorcycles, motor scooter, and the like, in part, because of the need for a relatively compact device.

It is an object of the invention to provide a compact mechanism which will substantially reduce the probability of theft of a vehicle.

It is another object of the invention to provide a relatively simple construction that may be manufactured easily and inexpensively.

SUMMARY OF THE INVENTION

The foregoing objects and other objects and advantages which shall become apparent from the detailed description of the preferred embodiment are attained in an apparatus for cooperation with an associated motor vehicle having a first part which rotates during powered movement of the associated motor vehicle and a second discrete part which is disposed proximate to the first part. The first part moves independently of the second part. The apparatus includes first and second elongated members, means pivotally mounting the first member to the second member, and means on one of the first and second members cooperating with one of the first and second parts of the associated motor vehicle. The means on one of the first and second members is dimensioned and configured for providing such apparatus an interfering relationship with the other part of the first and second associated motor vehicle.

The apparatus may include means for releasably engaging the first and second members to prevent relative pivotal motion therebetween. The means pivotally mounting may comprise each of the elongated members having a first axial extremity which includes a portion thereof extending in a direction which is generally perpendicular to an axis of the first member.

The means for releasably engaging may comprise openings in the first and second members which are dimensioned and configured for engagement with an associated lock. The axial extremities of the first and second members may be disposed so that at least a portion thereof extends in a direction which is generally toward the other of the first and second members. The first axial extremity may be generally U-shaped and the other axial extremity may be generally L-shaped. The first and second members may include a generally planar portion and the generally planar portions of the first and second members may be disposed in generally planar contact. The generally planar portions may be disposed proximate to the means pivotally mounting. The openings in the first and second members may be disposed in registered relationship in at least one pivotal position of the first and second members. The first axial extremities may positively engage an associated sprocket of the associated vehicle. In other embodiments, the first axial extremities positively engage an associated disc of associated disc brakes of the associated vehicle.

BRIEF DESCRIPTION OF THE ACCOMPANYING DRAWING

DESCRIPTION OF THE PREFERRED EMBODIMENT

Figure 1:
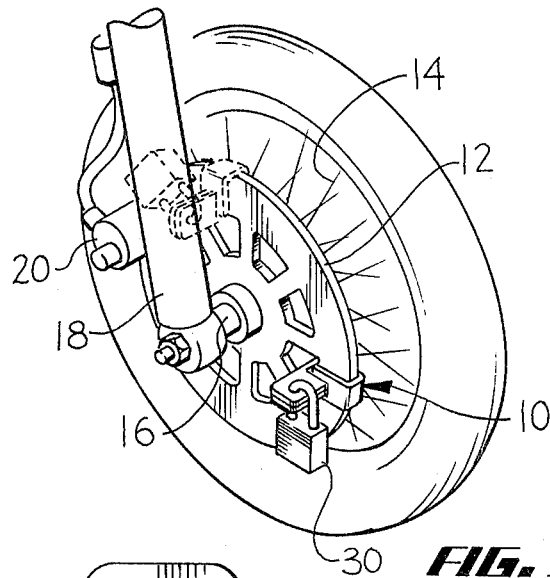
FIG. 1 is a partial perspective view of a first embodiment of the invention installed on a brake disc structure of a motorcycle wheel assembly.
Figure 2:
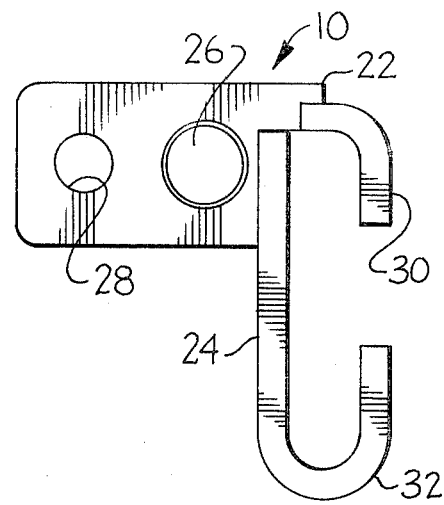
FIG. 2 is an elevational view of the apparatus in accordance with the invention illustrated in FIG. 1, with the jaws thereof in a position in which they engage the brake disc.
Figure 3:
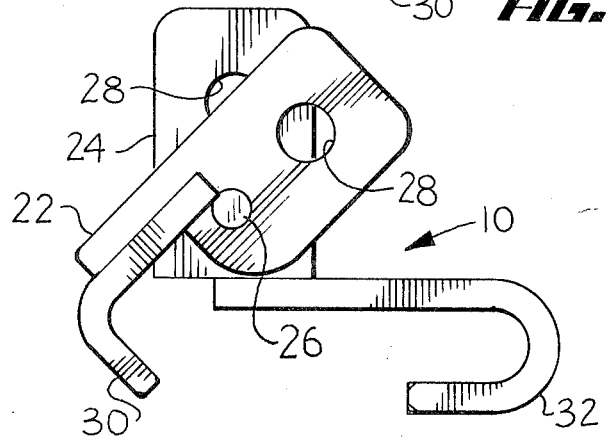
FIG. 3 is an elevational view of the opposite side of the apparatus illustrated in FIG. 2, and which further illustrates the apparatus with the jaws thereof disposed in the open position.
Figure 4:
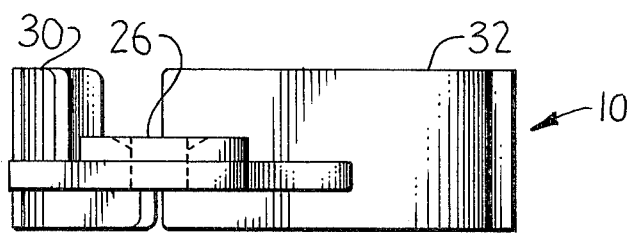
FIG. 4 is a plan view of the apparatus illustrated in FIGS. 1-3.

Referring now to FIGS. 1-4, there is shown a locking mechanism 10 which is configured for engagement with an associated disc brake disc 12 carried on a wheel 14. The wheel 14 is carried on an axle 16. A shock absorber 18 and a caliper assembly 20 is also shown.

The locking assembly 10 includes first and second elongated members 22, 24 which are secured together by a machine screw or rivet 26. The first and second members 22, 24 are each provided with a hole 28 for cooperation with an associated lock 30. The holes 28 are disposed in registered relationship with the locking mechanism 10 is disposed in the engaged position illustrated in FIGS. 1 and 2. The portion of each of the first and second members 22, 24 adjacent to the screws or rivet 26 and the hole 28 is generally planar and the generally planar member of each member 22 or 24 has planar contact with the generally planar portions of the other member 22 or 24.

The apparatus 10 includes jaws 30, 32 respectively disposed on first and second members 22, 24. The jaw 32 is generally U-shaped and cooperates with jaw 30. The jaw 32 ordinarily wraps around a portion of the disc 12 of the associated motorcycle and the jaw 30 insures that the apparatus 10 is not removed unintentionally. More specifically, the padlock 30 insures that the jaws 30, 32 stay firmly engaged with the disc 12.

Any attempt to move the motorcycle will, as best seen in FIG. 1, result in the generally planar portion of the first and second members 22, 24 striking the shock absorber 18. The apparatus thus allows a maximum movement of approximately 360 degrees before there is interfering engagement between the locking apparatus 10 and the shock absorber 18.

It will be understood that other structural elements of the motorcyle may be utilized to provide the required locking action.

Referring now to FIGS. 5–8, there is shown a second embodiment of the invention which comprises a locking apparatus 40, in accordance with the invention. The apparatus 40 is shown installed on the associated sprocket 42 and chain 44 of an associated motorcycle having a wheel 14. For simplicity, the supporting structure for the axle 16 has been omitted.

The apparatus 40 includes first and second members 46 and 48. The elongated member 46 includes a generally U-shaped hook 50 which ordinarily passes through an opening in the sprocket 42 and is secured by an L-shaped hook 52 which is part of the second elongated member 40.

The construction of the locking apparatus 40 is similar to the locking apparatus 10 in that each elongated member 46, 48 is provided with a generally planar area in which is disposed a pivot pin, rivet or bolt 54 and a separate hole 56. The holes 56, 56 are disposed in registered relationship when elongated members 46, 48 are pivoted to the position illustrated in FIGS. 5, 7 and 8. In this position a padlock 30 cooperates therewith to prevent removal of the locking apparatus.

Figure 5:
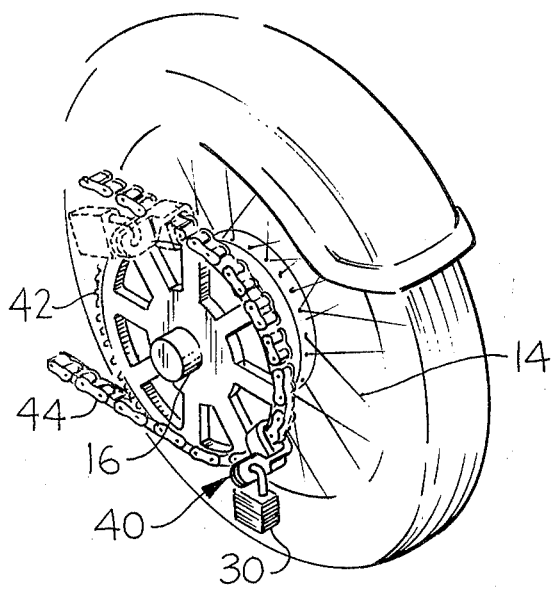
FIG. 5 is a partial perspective view of a second embodiment of the apparatus, in accordance with the invention, installed on a sprocket and chain assembly of an associated motorcyle.
Figure 6:
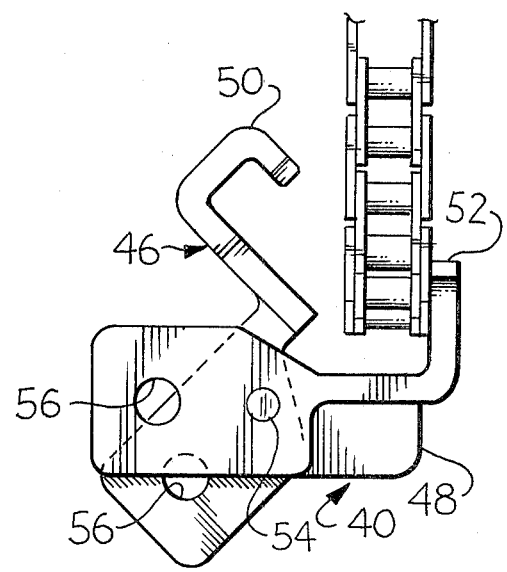
FIGS. 6 and 7 are respectively elevational views of the apparatus illustrated in FIG. 5, showing respectively the second embodiment about to be engaged with the chain and sprocket and after engagement with the chain and sprocket.
Figure 7:
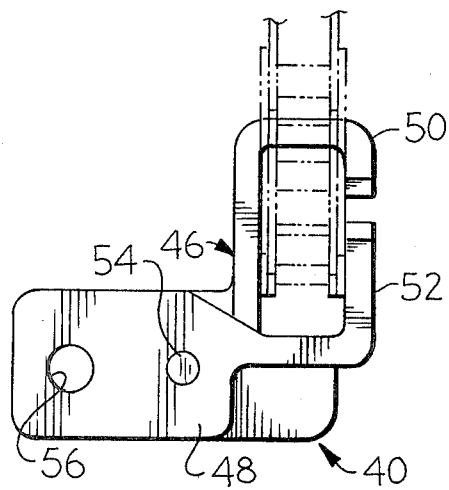
Figure 8:
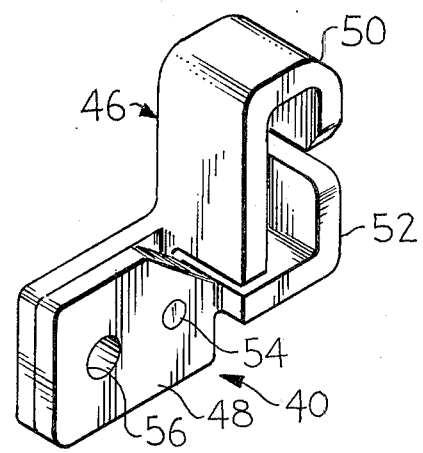
FIG. 8 is another perspective view of the second embodiment illustrated in FIGS. 5-7.

It will thus be seen that any attempt to move the associated motorcycle, illustrated in FIG. 5, will result in the locking apparatus 40 limiting movement of the chain 44 away from the sprocket 42 and thus prevent movement of the motorcycle. It will be understood that the apparatus may similarly be employed on the sprocket (not shown) carried on the engine. In various other embodiments of the invention, the apparatus 40 may be disposed so as to have physical interference with the frame of the motorcycle. The apparatus may clamp onto a sprocket and merely interfere with a portion of the frame or other stationary part of the motorcycle.

The invention has been described with reference to its illustrated preferred embodiment. Persons skilled in the art of constructing vehicle locking devices may, upon exposure to the teachings herein, conceive variations in the mechanical development of the components therein. Such variations are deemed to be encompassed by the disclosure, the invention being delimited only by the appended claims.

The inventor claims:

1. Apparatus for locking an associated motor vehicle having a first part which is a brake disc which rotates during powered movement of the associated motor vehicle and a second discrete part which is disposed proximate to the first part, the first part rotating with respect to the second part, said apparatus consists of:
   first and second elongated members;
   first means for pivotally mounting said first member to said second member for movement between first and second positions;
   second means on said first and second members cooperating with the first part of the associated motor vehicle, said second means being dimensioned and configured for (1) interfering relationship of said members with the other of the first and second parts of the associated motor vehicle when installed on the motor vehicle in said first position and (2) non-interfering relationship in said second position;
   said second means constituting respective first and second axial extremities on said first and second members, said first and second axial extremities cooperating to substantially surround and positively engage at least a portion of the brake disc, one of said axial extremities being generally U-shaped and the other of said axial extremities being generally L-shaped;
   third means in said first and second members for cooperation with an associated padlock to prevent relative pivotal motion therebetween; and
   said first and second members including a generally planar portion and said generally planar portions of said first and second members being disposed in generally planar contact.

2. The apparatus as described in claim 1, wherein:
   said generally planar portions are disposed proximate to said first means.

3. The apparatus as described in claim 2, wherein:
   said third means constitutes openings in said first and second members disposed in registered relationship in at least one pivotal position of said first and second members.

4. Apparatus for locking an associated motor vehicle having a first part which is a spoked sprocket which rotates during powered movement of the associated motor vehicle and a second discrete part which is disposed proximate to the first part, the first part rotating with respect to the second part, which consists of:
   first and second elongated members;
   first means for pivotally mounting said first member to said second member for movement between first and second positions;
   second means on said first and second members cooperating with the first part of the associated motor vehicle, said second means being dimensioned and configured for (1) interfering relationship of said members with the other of the first and second parts of the associated motor vehicle when installed on the motor vehicle in said first position and (2) non-interfering relationship in said second position;
   said second means constituting respective first and second axial extremities on said first and second members, said first and second axial extremities cooperating to substantially surround and positively engage at least a portion of the spoked sprocket, one of said axial extremities being generally U-shaped and the other of said axial extremities being generally L-shaped;
   third means in said first and second members for cooperation with an associated padlock to prevent relative pivotal motion therebetween; and
   said first and second members including a generally planar portion and said generally planar portions of said first and second members being disposed in generally planar contact.

5. The apparatus as described in claim 4, wherein:
   said generally planar portions are disposed proximate to said first means.

6. The apparatus as described in claim 5, wherein:
   said third means constitutes openings in said first and second members disposed in registered relationship in at least one pivotal position of said first and second members.

* * * * *